United States Patent
Downer et al.

(10) Patent No.: US 8,126,873 B2
(45) Date of Patent: Feb. 28, 2012

(54) PORTABLE AND ITERATIVE RE-USABLE SUBOPTIMIZATION OF DATABASE QUERIES

(75) Inventors: Robert Victor Downer, Rochester, MN (US); Wei Hu, Rochester, MN (US); Shantan Kethireddy, Rochester, MN (US); Andrew Peter Passe, Rochester, MN (US); Ulrich Thiemann, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 11/735,095

(22) Filed: Apr. 13, 2007

(65) Prior Publication Data

US 2008/0256024 A1 Oct. 16, 2008

(51) Int. Cl.
*G06F 17/30* (2006.01)
(52) U.S. Cl. .................................................... 707/720
(58) Field of Classification Search ............... 707/2, 720
See application file for complete search history.

(56) References Cited

U.S. PATENT DOCUMENTS

| | | | |
|---|---|---|---|
| 6,269,431 B1 | 7/2001 | Dunham | |
| 6,353,833 B1 | 3/2002 | Bird et al. | |
| 6,438,741 B1 * | 8/2002 | Al-omari et al. | 707/694 |
| 6,466,931 B1 | 10/2002 | Attaluri et al. | |
| 6,766,318 B1 | 7/2004 | Guay et al. | |
| 6,957,435 B2 | 10/2005 | Armstrong et al. | |
| 7,051,174 B2 | 5/2006 | Ash et al. | |
| 7,133,861 B2 * | 11/2006 | Day et al. | 707/2 |
| 7,155,428 B1 | 12/2006 | Brown et al. | |
| 7,831,569 B2 | 11/2010 | Bestgen et al. | |
| 7,991,763 B2 | 8/2011 | Bestgen et al. | |
| 2003/0065644 A1 | 4/2003 | Horman et al. | |
| 2003/0212668 A1 | 11/2003 | Hinshaw et al. | |
| 2004/0087300 A1 | 5/2004 | Lewis | |
| 2004/0243799 A1 | 12/2004 | Hacigumus et al. | |
| 2005/0028134 A1 | 2/2005 | Zane et al. | |
| 2005/0097078 A1 | 5/2005 | Lohman et al. | |
| 2005/0131878 A1 | 6/2005 | Chen et al. | |
| 2005/0131879 A1 | 6/2005 | Ghosh et al. | |
| 2005/0149505 A1 | 7/2005 | Bossman et al. | |
| 2005/0234900 A1 | 10/2005 | Bossman et al. | |
| 2005/0267877 A1 | 12/2005 | Chaudhuri et al. | |
| 2006/0059205 A1 | 3/2006 | Shah et al. | |

(Continued)

OTHER PUBLICATIONS

Bonnet, Philippe et al., Partial Answers for Unavailable Data Sources (12 pages.).

(Continued)

*Primary Examiner* — James Trujillo
*Assistant Examiner* — Amresh Singh
(74) *Attorney, Agent, or Firm* — Wood, Herron & Evans LLP (57) ABSTRACT

A method, apparatus and program product to optimize a database query. A query plan is generated for the database query where the query plan includes first and second subplans. Cached optimization data associated with the first subplan and generated during evaluation of another query plan for a previous query that uses the first subplan is retrieved. The first subplan is evaluated for resource cost using the retrieved optimization data. The second subplan is also evaluated for resource cost. The query plan is then evaluated for resource cost based upon the evaluations of resource cost for the first and second subplans. A query plan is selected based on evaluations of resource cost and the plan is executed to generate a result set.

25 Claims, 4 Drawing Sheets

U.S. PATENT DOCUMENTS

| | | | |
|---|---|---|---|
| 2006/0112093 A1 | 5/2006 | Lightstone et al. | |
| 2006/0195416 A1 | 8/2006 | Ewen et al. | |
| 2006/0218123 A1 | 9/2006 | Chowdhuri et al. | |
| 2006/0230016 A1 | 10/2006 | Cunningham et al. | |
| 2007/0078825 A1 | 4/2007 | Bornhoevd et al. | |
| 2007/0220058 A1* | 9/2007 | Kandil et al. | 707/200 |
| 2008/0133458 A1 | 6/2008 | Zabback et al. | |
| 2008/0162416 A1 | 7/2008 | Sinclair | |

OTHER PUBLICATIONS

Raman, Vijayshankar et al., Progressive Optimization in Action, 2004 (4 pages.).

U.S. Patent and Trademark Office, Office Action issued in related U.S. Appl. No. 11/735,133, dated Apr. 30, 2009.

U.S. Patent and Trademark Office, Office Action issued in related U.S. Appl. No. 11/735,133, dated Nov. 25, 2009.

U.S. Patent and Trademark Office, Final Office Action issued in related U.S. Appl. No. 11/735,133, dated Jun. 9, 2010.

U.S. Patent and Trademark Office, Office Action issued in related U.S. Appl. No. 11/735,133, dated Oct. 28, 2010.

U.S. Patent and Trademark Office, Notice of Allowance issued in U.S. Appl. No. 11/735,133, dated Mar. 18, 2010.

U.S. Patent and Trademark Office, Notice of Allowance issued in related U.S. Appl. No. 11/870,118, dated Jun. 30, 2010.

* cited by examiner

PORTABLE AND ITERATIVE RE-USABLE SUBOPTIMIZATION OF DATABASE QUERIES

CROSS REFERENCE TO RELATED APPLICATIONS

This invention is related to U.S. patent application Ser. No. 11/735,133, filed on even date herewith by Robert Joseph Bestgen et al., and entitled "Database Query Optimization Utilizing Remote Statistics Collection" (ROC920060448-US1), which is herein incorporated by reference in its entirety.

FIELD OF THE INVENTION

The present invention generally relates to computers and data processing and, more particularly, to optimizing database queries.

BACKGROUND OF THE INVENTION

One of the most difficult aspects of database query optimization is the balancing act necessary to find the best strategy to run the query without taking too long to find it. A query optimizer is a component of a database management system that attempts to determine the most efficient way to execute a query. The output of an optimizer is typically referred to as a query plan or access plan, which is a form of executable code that can be processed by a database engine to execute the query. Many optimizers operate by selecting or generating multiple potential query plans for a given query, and selecting from the potential query plans an optimal query plan.

Cost-based query optimizers typically operate by assigning an estimated "cost" to each possible query plan, and then choosing the plan with the least cost. Costs are used to estimate the runtime cost of evaluating the query, in terms of the number of I/O operations required, the CPU requirements, and other factors.

A query optimizer internally has a number of strategies that it uses to generate the set of query plans examined. The strategies, such as join strategy, union strategy, index strategy, grouping strategy, ordering strategy, etc., may be called recursively, so a join strategy may call an ordering strategy for a leg which in turn may call an indexing strategy which may call another strategy. Each strategy examines the possible access paths (e.g. index scan, sequential scan) and join algorithms (e.g. sort-merge join, hash join, nested loops). Thus, the search space can become quite large depending on the complexity of the query.

Given enough time, a query optimizer should be able to find a best plan by evaluating all possible query plans. However, in many cases it is impossible, or at least inadvisable, to try all possibilities. Depending on the complexity of the query, the search space of query plans for the optimizer could be so large that the time required to optimize the query could potentially exceed that amount of time necessary for an unoptimized query to complete. Thus, the resultant increase in optimization time would be unacceptable for many customers. Therefore, it is often only possible to attempt a subset of the query plans available for a given query, which may result in the selection of a suboptimal plan. A goal is to accomplish as much optimization as possible in the shortest amount of time. This may result in a need to defer some of the optimization tasks.

Optimization consists of multiple steps including generating query plans, collecting statistics on the data related to the query plans, using the statistics to estimate resource costs of the plan, and selecting a plan with the optimum resource costs. One of the resource intensive tasks of the optimization is collecting the statistics. Statistical information for the data in the underlying database may relate to an index, tables and their indices, objects in a schema, objects in a database, etc. Some deep statistics collections that may require extensive amounts of resources wouldn't be attempted on production systems due to time and resource constraints. When collecting statistics for a query in a production environment, there is a need to look at the current CPU utilization, the resources available, and then try to do the statistics collection without unduly loading the system. If a full statistics collection will overly load the system, a partial statistics collection may be executed, deferring the remaining collection for later.

An example of an approach that often provides suboptimal plans as a result of this crunch for time and resource are plans based on an indexing strategy. Indexing is an optimization technique that uses indices built over columns to provide quicker access to the necessary data. The indexing strategy problems that are caused by the rush to get through optimization are twofold. First, in order to use an index, the optimizer must be able to represent the query's predicates in such a way that it can most efficiently and properly match with the correct indices. To accomplish this, predicates are represented in their disjunctive normal form ("DNF"). Unfortunately, building the DNF for a set of predicates can be very time consuming, as the time needed for DNF creation rises dramatically as the number of predicates, as well as the complexity of the predicates involved, increases. Therefore, depending on the set of predicates involved, it is often far too time-consuming to consider, so the DNF conversion is not done, and the indexing strategy, in turn, cannot be attempted.

Second, even if the DNF is created, it is often the case that the optimizer is unable to try all possible index combinations. In most cases, the columns that are covered by each index do not match up perfectly with columns referenced by the queries. It is especially common to have an index, which covers only a subset of the columns referenced by the query. In such a case, it can be beneficial to use multiple indices together to provide access to all necessary columns. One of the most important jobs of an optimizer can be to find a plan with the best possible combination of indices to include all necessary columns. However, as the number of columns in a table and the number of indices over the table increase, the time taken to run this indexing strategy increases exponentially, so the optimizer must employ some strategy to minimize the time taken. Currently, this strategy is generally to search through the plans containing the index combinations until one is found that is "good enough", which often simply means that all columns are covered, but not necessarily with the optimal combination.

Several strategies exist for solving the problem of optimization techniques taking too long. The primary strategy for handling situations in which optimization time may become overly time consuming, as with the indexing strategy above, is simply to find a plan that is "good enough", or sufficient to provide a reasonably well-behaved plan. In other words, the optimizer will work until it finds a plan that works, but won't necessarily continue searching for better performing plans. Unfortunately, with very large databases or complex queries, even a plan that is considered "good enough" may be far inferior to other plans, which are not even attempted.

Another strategy that is often employed is simply not to even try a technique if it is deemed to be too time-consuming for the given query. In the case above, the predicates are given a score based on the complexity of the predicates, the number of predicates, and how the predicates are combined. If the complexity score is too high, the optimizer does not even attempt to create a DNF, thus saving time, but possibly overlooking a number of strong plans. This creates the obvious problem of completely dismissing optimization techniques and potentially overlooking the best performing plans.

Still another strategy that is used is to save a plan for a given query and, if possible, reuse or expand on this plan in future runs of the same query. The problem with this is that it is only helpful for future runs of the exact same query. Even with minimal changes to the query, the optimizer will be forced to completely restart each optimization strategy. Another problem with this strategy is that the entire query plan is saved, rather than just the portions that are unfinished or can be expanded on. This requires extra space on the system and may cause optimization problems when saving and loading the cached plans.

SUMMARY OF THE INVENTION

The invention addresses these and other problems associated with the prior art by providing an apparatus, a program product, and a method that break down query plans into subplans and reuse optimization data from the subplans to optimize new query plans. Embodiments consistent with the invention as a result are capable of running a more exhaustive examination of optimization techniques than is currently feasible in the minimal amount of time given for a query optimization by sharing optimization information not only with other runs of the same query, but also with any runs of similar queries that run the same techniques with similar information.

Consistent with one aspect of the invention, a method for optimizing a database query generates a query plan for the database query, where the query plan includes first and second subplans. Cached optimization data associated with the first subplan and generated during evaluation of another query plan for a previous query that uses the first subplan is retrieved. The first subplan is evaluated for resource cost using the retrieved optimization data. The second subplan is also evaluated for resource cost. The query plan is then evaluated for resource cost based upon the evaluations of resource cost for the first and second subplans.

In some embodiments, evaluating the first and second subplans for resource cost comprises collecting statistics on the first and second subplans and estimating resource costs based on the collected statistics. Evaluating the query plan for resource costs comprises comparing estimated resource costs between subplans, selecting or discarding subplans based on the resource costs, and estimating resource costs for the query plan based on the selected subplans. After the query plans have been evaluated, a query plan is selected based on evaluations of resource cost and the query plan is executed to generate a result set.

In other embodiments, in response to a change in data that is part of the database query, the first and second subplans are evaluated to determine the effect of the change on the plans. The first and second subplans are reoptimized if they are affected by the change.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

Figure 1:
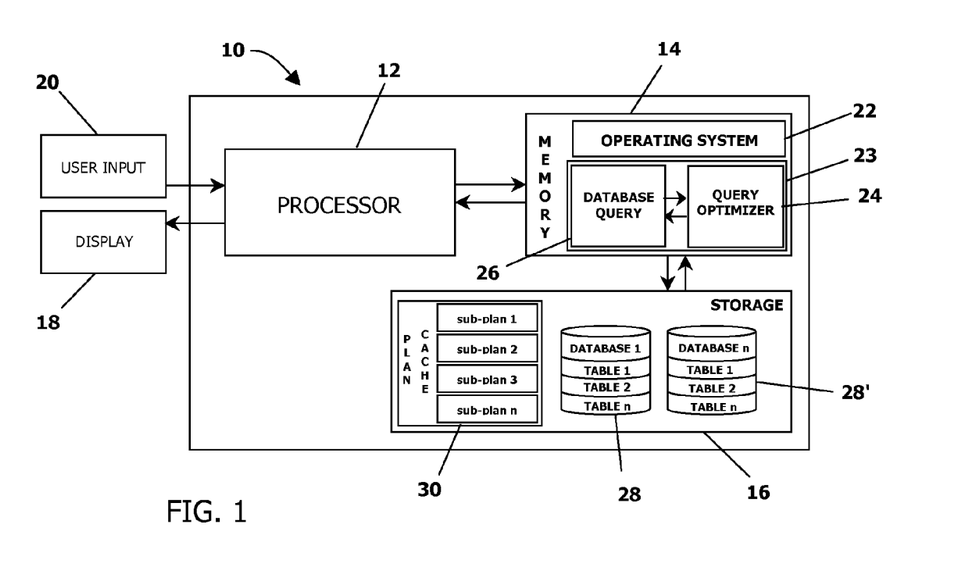
FIG. 1 is a block diagram of an exemplary hardware and software environment for a computer suitable for implementing database query optimization consistent with the invention.

Turning to the drawings, wherein like numbers denote like parts throughout the several views, FIG. 1 illustrates an exemplary hardware and software environment for an apparatus 10 suitable for implementing query optimization consistent with the invention. For the purposes of the invention, apparatus 10 may represent practically any computer, computer system, or programmable device e.g., multi-user or single-user computers, desktop computers, portable computers and devices, handheld devices, network devices, mobile phones, etc. Apparatus 10 will hereinafter be referred to as a "computer" although it should be appreciated that the term "apparatus" may also include other suitable programmable electronic devices.

Computer 10 typically includes at least one processor 12 coupled to a memory 14. Processor 12 may represent one or more processors (e.g. microprocessors), and memory 14 may represent the random access memory (RAM) devices comprising the main storage of computer 10, as well as any supplemental levels of memory, e.g., cache memories, non-volatile or backup memories (e.g. programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device 16.

Computer 10 also typically receives a number of inputs and outputs for communicating information externally. For interface with a user or operator, computer 10 typically includes one or more user input devices 20 (e.g., a keyboard, a mouse, a trackball, a joystick, a touchpad, a keypad, a stylus, and/or a microphone, among others). Computer 10 may also include a display 18 (e.g., a CRT monitor, an LCD display panel, and/or a speaker, among others). The interface to computer 10 may also be through an external terminal connected directly or remotely to computer 10, or through another computer communicating with computer 10 via a network, modem, or other type of communications device.

Computer 10 operates under the control of operating system 22 and executes or otherwise relies upon various computer software applications, components, programs, objects, modules, data structures, etc. (e.g. database application 23). Moreover, various applications, components, programs, objects, modules, etc. may also execute on one or more processors in another computer coupled to computer 10 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in specific embodiments of the invention. However, it should be appreciated that any particular program nomenclature that follows is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

An embodiment of the present invention provides a method for running more exhaustive examinations of optimization techniques than is currently feasible in the minimal amount of time given for query optimization by sharing subplan information not only with other runs of the same query, but also with any runs of similar queries that run the same techniques with similar information. An advantage of the embodiment relates to the situation where an optimizer is forced to cut short its optimization of a certain query aspect for reasons of time or resource constraints, as the information gained before it was forced to stop will be cached and used in later runs of the same or similar queries looking for the same information. These future runs will then have a head start on the information they need, and will then have extra time to execute further optimization that the first query was unable to complete, eventually caching this new information along with the already cached data from the first run. In this way, as these queries run, the optimizer gradually builds a better and better picture of the information used by the optimizer, until eventually the optimizer has enough information to provide better query plans.

A basic premise for the design of portable and re-usable suboptimization techniques is to create and maintain a structure that will "save" progress on an optimization technique that was unable to be completely exhausted within a single run of a query. The saved progress may then be re-used and expanded by either another run of the same query or another query that is looking for solutions to the same optimization technique, given the same set of parameters. Following is an example of how the design might run with reuse of the indexing strategy sub-optimization technique.

In the example, when a query is run and indexing strategy begins, the optimizer may first look for any available saved indexing strategies, given the columns needed. If a strategy is not found, the optimizer may then start from scratch, eventually finding what it considers to be the best plan, given the limited time it is allowed to use. The optimizer may then save information from the indexing strategy process, including, but not limited to, columns involved, indexes available, strategy chosen, strategies tried, and strategy cost estimates.

The next time a query is run that requests an indexing strategy over the same set of columns, it will then find the saved information and will have the ability to reuse and expand upon the saved strategies. Upon first finding the saved strategy information, the optimizer may then check to ensure the indexes specified in the saved strategy are still available. If so, the optimizer may analyze the saved "best plan", including its cost estimate, to decide whether just to use the saved plan, or instead to first try more index combinations to search for an even better plan. If the saved plan is deemed inefficient or if the optimizer now has additional indexes to choose from, the optimizer may then attempt to improve on the cached indexing plan. After trying some number of additional strategies, the optimizer may then cache whatever new information it has found along with the information from before the run. In this way, the optimizer is able to gradually improve upon its indexing plans by continually trying new combinations, without ever taking an excessive amount of time to optimize.

A query plan typically consists of a set of steps used to access information typically in a relational database management system. A query plan consistent with the invention may be viewed as a collection of subsets or "subplans", each of which may be optimized individually. Optimization data associated with the subplans may include statistics data for a query plan. The statistics data may be related to statistical information such as, but not limited to, an index, tables and their indices, objects in a schema, objects in a database, etc. Optimization data may also include progress data for partially optimized plans consisting of, for example, statistics collected, costing data for portions of the query plan derived from the statistical data from the statistics collection, plan cost data for a query plan used to evaluate the plan against other plans, costing data and statistics for fully optimized plans and/or subplans. In the present embodiment, optimization data may be saved for future use in a query plan cache. Data in the plan cache may be stored and updated as the query optimizer performs further optimizations on query plans. The cache may be used by the optimizer to store and retrieve optimization data to avoid excessive time spent on reevaluation of query plans and subplans. In alternate embodiments not using a cache to make the optimization data persistent, flat files or a database related to the underlying data in the query plan and configured to store optimization data may be utilized. Other embodiments may employ other methods of making the optimization data persistent and available to the query optimizer.

Figure 2A:
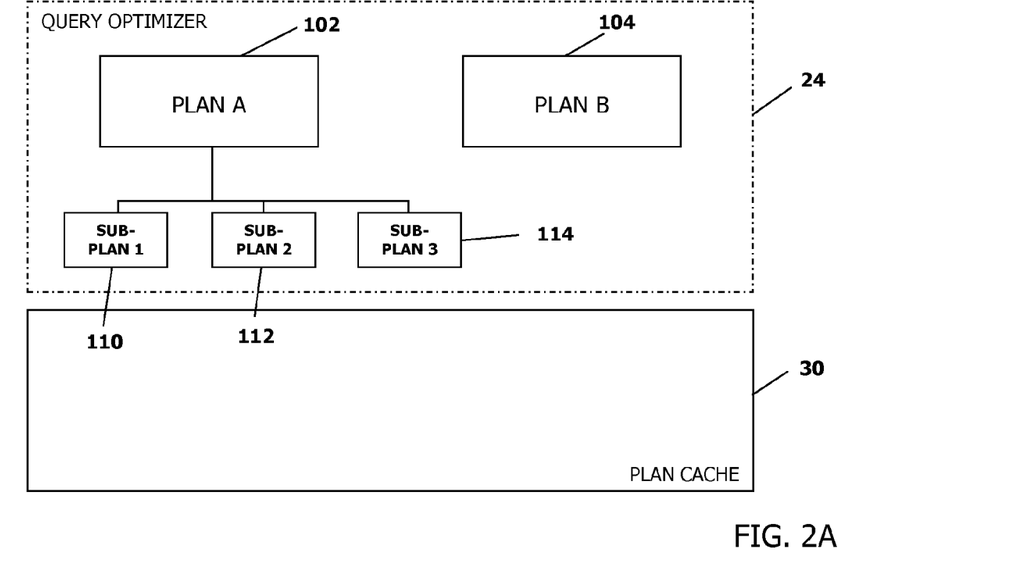
FIG. 2A is block diagram of the query optimizer and plan cache of FIG. 1 illustrating the creation of subplans.

Subplans may also be common across multiple queries, reducing the amount of time needed to optimize a query plan. This breakdown may be seen in the graphical representations of query plans and subplans, consistent with the present invention, in FIGS. 2A-3B. In FIG. 2A, the query optimizer 24 may be used to optimize query plans A (102) and B (104). Query plans A (102) and B (104) may be plans generated for the same query or they may be plans generated for different queries as mentioned above. Query plan A (102) may consist of subplan 1 (110) subplan 2 (112) and subplan 3 (114). When the query optimizer 24 optimizes query plan A (102), each of the sub plans 110, 112, and 114 is also optimized. These optimized subplans may then be stored in plan cache 30.

Figure 2B:
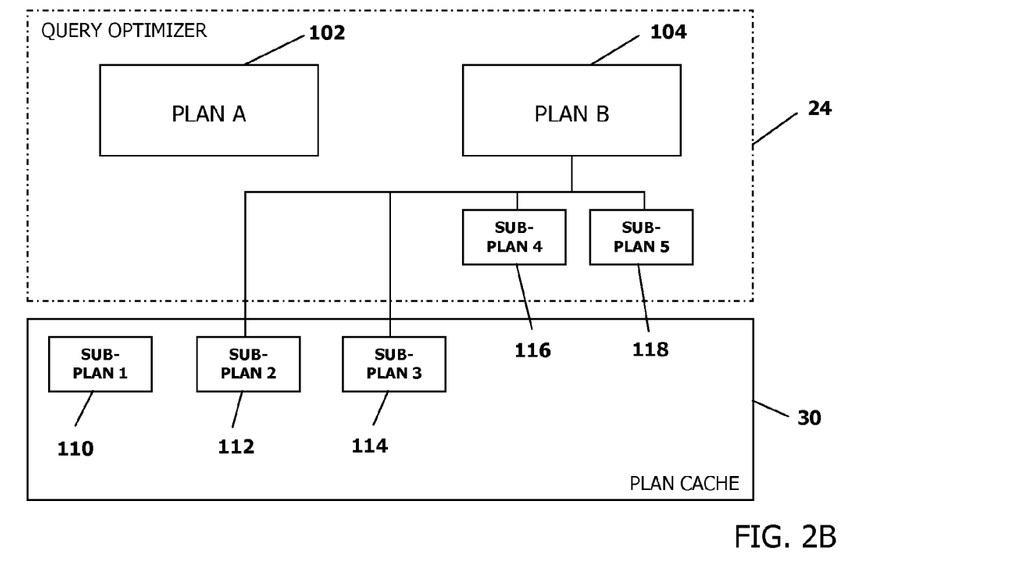
FIG. 2B is block diagram of the query optimizer and plan cache of FIG. 2A illustrating the reuse of subplans in subsequent query plan evaluations.

Referring now to FIG. 2B, when the query optimizer 24 begins the optimization process for query plan B (104), some of the sub-optimizations performed on the subplans may be reused. For example, query plan B (104) consists of four subplans 112, 114, 116 and 118. Of these four subplans, two 112, 114 were optimized as part of the optimization performed on query plan A (102). These two sub-optimizations may be retrieved from the plan cache 30 to be reused in the optimization for query plan B (104). As part of this optimization, the query optimizer 24 need only perform full optimization on subplan 4 (116) and subplan 5 (118). After the optimization of query plan B (104) is complete, the optimized subplans that are new may be stored in plan cache 30. As the query optimizer 24 performs more optimizations, a library of optimized subplans or suboptimizations may be built in the plan cache 30 to be reused at a later time. As this information is saved along with the original information, the optimizer eventually will have a much more complete picture of all possible plans, and have a better idea of which is the ideal plan.

Figure 3A:
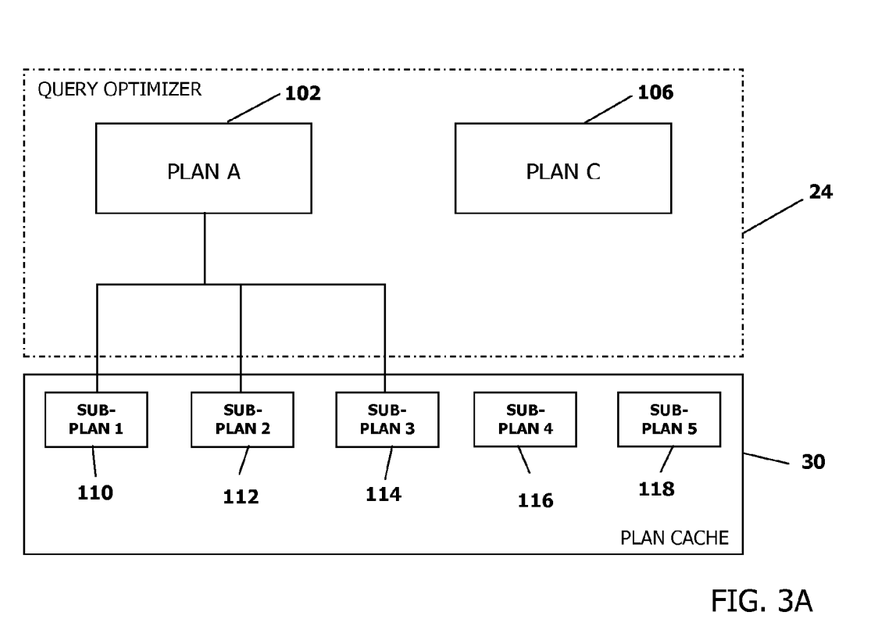
FIG. 3A is block diagram of the query optimizer and plan cache of FIG. 2B illustrating the reuse of subplans in subsequent query plan evaluations.
Figure 3B:
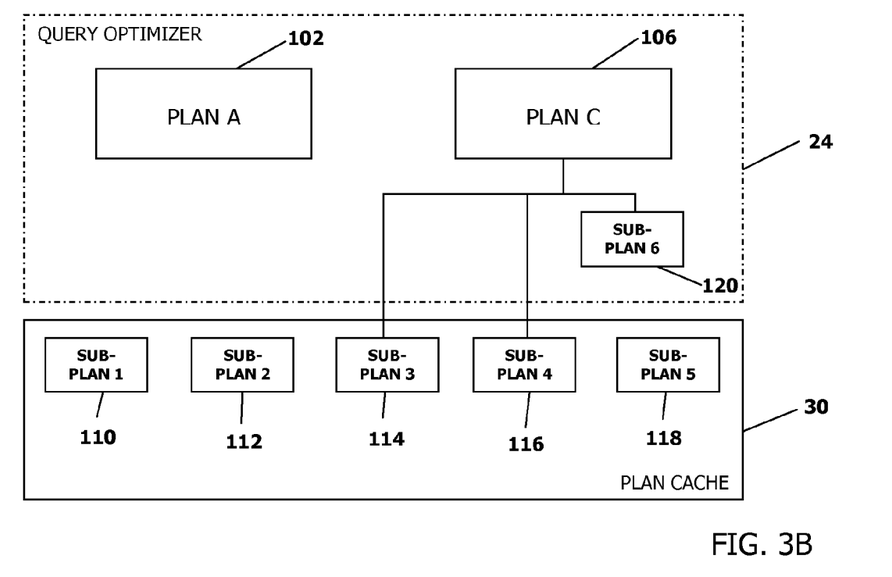
FIG. 3B is block diagram of the query optimizer and plan cache of FIG. 3A illustrating the reuse of subplans in subsequent query plan evaluations.

FIG. 3A shows two optimizations, query plan A (102) and query plan C (106), which are sent to the query optimizer 24. Because query plan A (102) has been previously optimized, the query plan's subplans 110, 112 and 114 are retrieved from the plan cache and no further optimization may need to be performed. The ability to retrieve previously optimized query plans allows the query optimizer to utilize the time typically spent on optimizing current query plans for further optimization of current or other plans or subplans. As can be seen in FIG. 3B, query plan C (106), which consists of three subplans 114, 116 and 120, may reuse some of the previous optimizations on the subplans stored in plan cache 30. Query plan C (106), may retrieve subplan 3 (114) and subplan 4 (116) from plan cache 30. The query optimizer 24 then may perform the full optimization on subplan 6 (120), which is the only non-optimized portion of query plan C (106).

Figure 4:
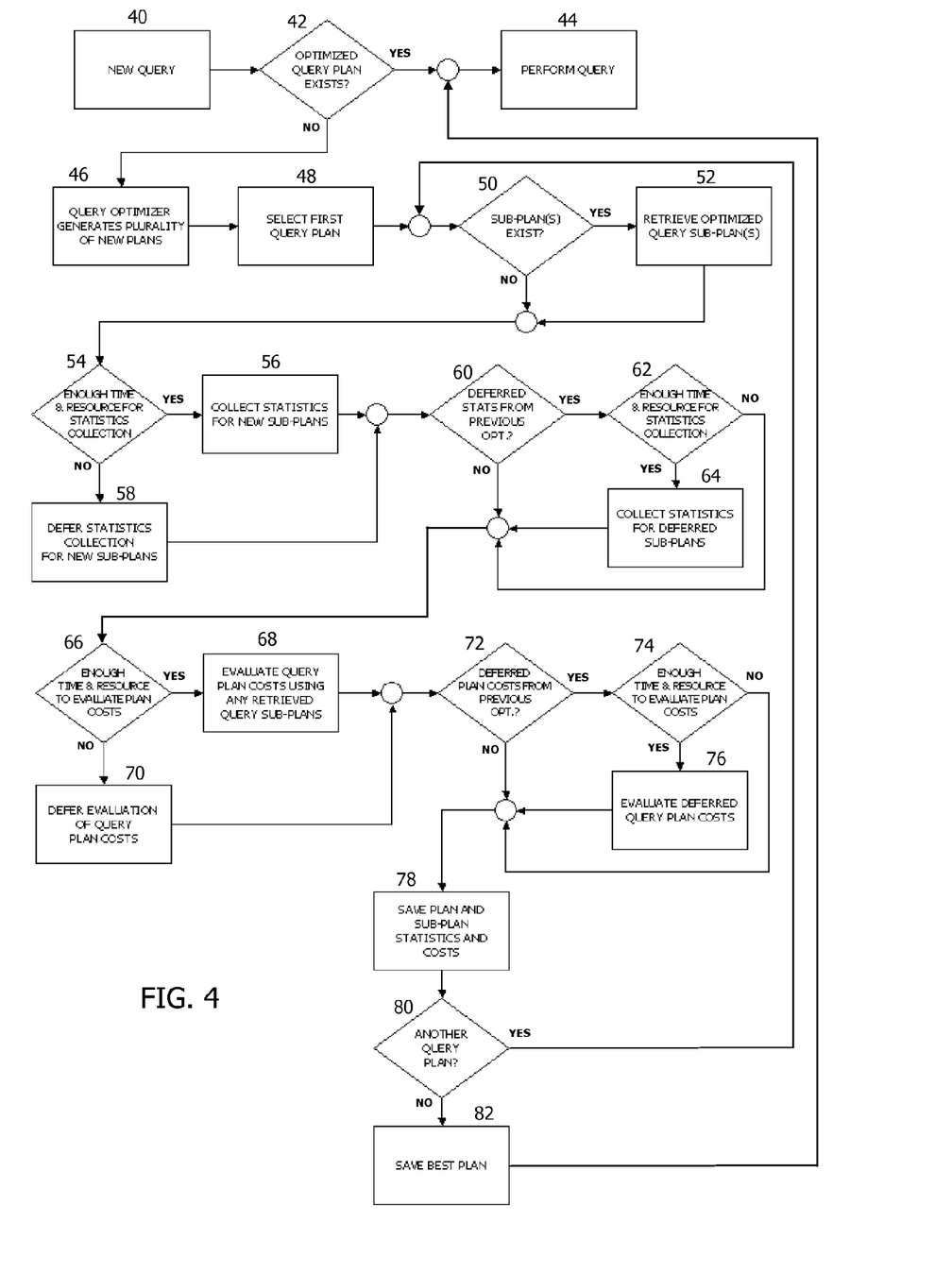
FIG. 4 is a flowchart of an exemplary process for optimizing a database query using query subplans consistent with the invention.

A method for performing sub-optimizations on sub-queries may be seen in FIG. 4. A new database query is received by the query optimizer in block 40. A check is made to see if this query already has an optimized query plan. If an optimized query plan exists (yes branch of decision block 42), the query is performed using the optimized query plan. If an optimized query plan does not exist (no branch of decision block 42), then the query optimizer generates a plurality of new potential plans in block 46 using querying strategies such as a join strategy, a union strategy, an index strategy, a grouping strategy, an ordering strategy, etc. After a set of potential plans is generated, the query optimizer in block 48 selects the first query plan.

A check is made in the plan cache to see if a subset of this particular query plan exists. As discussed above, in some embodiments, each query plan may consist of a group of subplans that in turn may have already been optimized by the query optimizer. If a subset of the query plan exists (yes branch of decision block 50), then those optimized query subplans may be retrieved in block 52. If no superset or subset of the query plan exists (no branch of decision block 50), then the optimizer continues and checks for resources to be able to perform statistics collections on the new subplans for the first query plan selected. If there is sufficient resource to perform the statistics collection (yes branch of decision block 54), statistic collection for any of the new subplans is performed in block 56. If there is insufficient time or insufficient resource to perform the statistics collection (no branch of decision block 54), then those statistic collections are deferred in block 58. Statistics collections may be performed completely for each of the subplans or if there are limited time and resources available, partial statistics collection may be performed with the remaining being deferred.

After the statistics collection has been performed or deferred, the query optimizer determines if time remains to do additional statistics collections. A check is made to see if there are deferred statistics from previous optimizations. If deferred statistics exist (yes branch of decision block 60), then a check is made to see if there is enough time and resources to complete the deferred statistics collection. If the time and resource is available (yes branch of decision block 62), then the statistics are collected for the deferred subplans in block 64. If there is insufficient time or resource for the statistics collection (no branch of decision block 62), or if there were no deferred statistics waiting to be collected from previous optimization runs (no block of decision block 60), then the optimizer proceeds to evaluate the new plan.

The next task for the query optimizer is to use the statistics to estimate and evaluate "costs" of a particular plan being analyzed. A check is made to determine if there are sufficient time and resources available to evaluate the plan costs. If the resources are available (yes branch of decision block 66), then the query plan is evaluated based on costs predicted from the collected statistics, plus any retrieved query subplans that have already been through the optimization process, to create an overall cost for the particular query plan in block 68. If the time and resource are insufficient to evaluate the query plan (no branch of decision block 66), then the evaluation of the query plan costs is deferred in block 70. As with statistics collection, the query optimizer may evaluate portions of the overall query plan's subplans based on time and resource that are available and defer the remaining subplans for which it does not have time to evaluate.

After the evaluation of the query plan, a check is made to see if there are any deferred plan costs from previous optimization modes. If there are deferred plan cost analysis (yes branch of decision block 72), then a check for time and resource is made to see if there are sufficient time and resources to evaluate the plan costs that have been deferred. If there are sufficient time and resources available (yes branch of decision block 74), then the query optimizer may evaluate any of the deferred plans for overall costs in block 76. If the resources are insufficient (no branch of decision block 74), or if there are no deferred plan cost evaluations (no branch of decision block 72), then the plans, subplans, statistics, and costs are stored in the plan cache for future use in block 78. A check is then made to see if there is another plan available that was generated by the query optimizer and, if so (yes branch of decision block 80), the process for evaluating the next plan is then performed. If all of the query plans have been exhausted, or if the time to evaluate the query plan has been exhausted (no branch of decision block 80), then the query optimizer saves the best plan information in the plan cache in block 82 and then performs the query in block 44.

When a query is run and the optimizer is forced to cut short its strategy as a result of optimization time constraints, information will be saved regarding the techniques used, other combinations tried, and the tables/columns that were required. When additional queries are run over the same columns, restoring the cached information will provide several advantages. First, the optimizer will automatically know which combination, out of all those already tried, resulted in the best match. This allows the optimizer to skip the combinations that were considered but not chosen, since the chosen combination is already known to be superior. Additionally, since the optimizer will save time by skipping those combinations already tried, it can then move on to try those combinations that the first query was forced to skip in order to minimize optimization time.

Because the progress of the plans has been saved and the optimized subplans have been saved along the way, the next time this particular query needs to be performed, the query optimizer may be able to continue optimization work on plans that have not been evaluated. If an optimum plan has been found, then the query optimizer may use the time that it would have spent optimizing for this particular query to optimize other deferred plans and subplans. Once a plan has been optimized, there still may be a need to re-optimize the plan if there is a change in the underlying data for that particular plan. Changes to the underlying data may include items such as an index that has become unavailable or an increase in a table size of about ten percent or more. Other items that may qualify as a change in data may include using or no longer using symmetric multiprocessing methods when performing the query.

Figure 5:
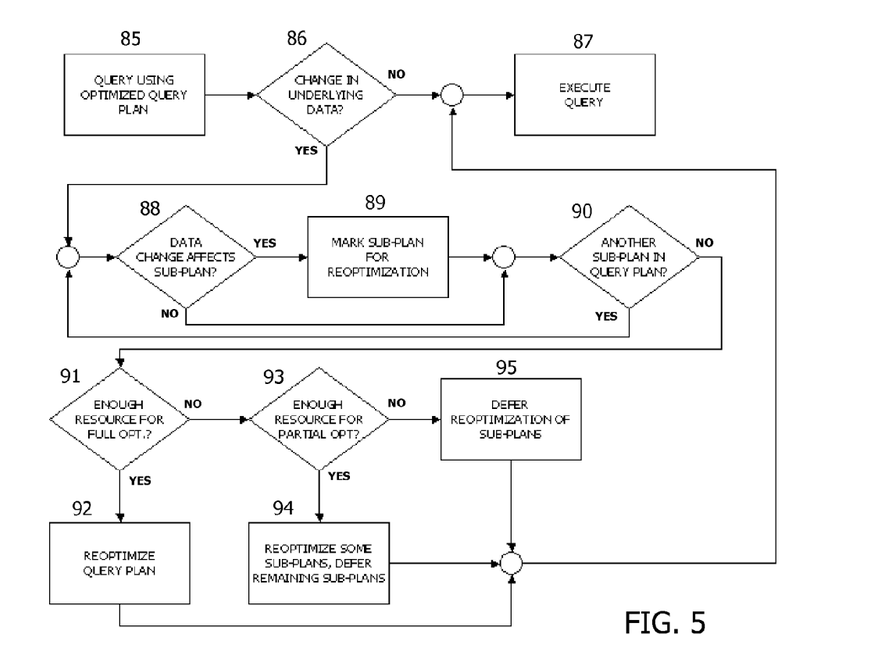
FIG. 5 is a flowchart of an exemplary process for reoptimizing query subplans in response to a change in the underlying data consistent with the invention.

Because the database queries are being performed on live data, and live data periodically changes it may be necessary to reoptimize query plans after data changes. The flowchart in FIG. 5 shows a method that may be utilized by an embodiment of the invention for reoptimization. Referring now to FIG. 5, the query optimizer receives a query for which it already has an optimized query plan in block 85. A check is made to see if there is a change in the underlying data for that particular query. If there is no change in the underlying data (no branch of decision block 86), then the query optimizer retrieves the optimum query plan and the query is executed using the optimum plan in block 87. If there is a change in the underlying data (yes branch of decision block 86), then a check is made to see if that data change affects any of the subplans comprising the optimized query plan. If the data change does affect the subplan (yes branch of decision block 88), then that particular subplan is marked for re-optimization in block 89. A check is then made for additional subplans in the query plan in decision block 90 and the process of marking each of the subplans continues until each of the sub-query plans has been evaluated. In other embodiments, instead of marking subplans, reoptimization may be performed as each affected subplan is found.

A check is then made for resources to re-optimize the query plan. If sufficient resources are available to fully optimize the marked subplans for the query (yes branch of decision block 91), then these subplans are re-optimized in block 92. If there is insufficient resource to re-optimize all of the query plans (no branch of decision block 91), then a check is made to see if resources are available to perform partial optimization of the query plans. If there are sufficient resources for partial optimization (yes branch of decision block 93), then re-optimization for some of the subplans occurs in block 94 with the remaining plans being deferred for later optimization. If the resources are insufficient to even do a partial re-optimization (no branch of decision block 93), then the re-optimization of the subplans is deferred in block 95.

One of the benefits of utilizing the subplans of the query plans and individually optimizing and performing statistics collections for these subplans is in cases where underlying data has changed and this change affects multiple queries. By re-optimizing subplans of each of the query plans, when other queries that have been affected by the change in the underlying data are encountered by the query optimizer, portions of these query plans for the query may already have been optimized, reducing the amount of time required to re-optimize the plan.

Consider again the example above, in which an optimizer is forced to cut short its index searching. The optimizer has the ability to eventually run a completely exhaustive search of indexing strategies for a set of queries in order to truly find the best possible plan. The best-known solution found in the query's first run is cached, as well as information regarding which indexing combinations have already been tried. This information is then reused for other queries searching for indexing over the same set of columns.

An aspect of this method that sets it aside from other reusable optimization strategies is that the cached information may be used not only on future runs of the same query, but also on any other queries that run similar optimization techniques over the same set of parameters. This is one example of how the design would work, but reuse of sub-optimization techniques could be employed in many other situations.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of applicants' general inventive concept.

What is claimed is:

1. A method for optimizing a database query on a computer, the method comprising:

generating a query plan for the database query, wherein the query plan includes first and second subplans;

retrieving cached optimization data associated with the first subplan and generated during evaluation of another query plan for a previous query that uses the first subplan, wherein the cached optimization data does not include cached query results, and wherein the cached optimization data is generated during evaluation of another query plan for a previous database query for which only partial optimization is completed and a portion of statistics collection for the other query plan is deferred;

evaluating by the hardware-implemented processor on the computer the first subplan for resource cost using the retrieved optimization data;

evaluating by the hardware-implemented processor on the computer the second subplan for resource cost; and evaluating by the hardware-implemented processor on the computer the query plan for resource cost based upon the evaluations of resource cost for the first and second subplans.

2. The method of claim 1 further comprising caching new optimization data associated with the first and second subplans.

3. The method of claim 1 wherein evaluating the second subplan does not rely on cached optimization data.

4. The method of claim 1 wherein evaluating the first and second subplans for resource cost comprises:
collecting statistics on the first and second subplans; and
estimating resource costs based on the collected statistics.

5. The method of claim 1 wherein evaluating the query plan for resource costs comprises:
comparing estimated resource costs between subplans;
selecting or discarding subplans based on the resource costs; and
estimating resource costs for the query plan based on the selected subplans.

6. The method of claim 1 further comprising:
selecting the query plan based on evaluations of resource cost; and
executing the query plan on the hardware-implemented processor on the computer to generate a result set.

7. The method of claim 1 wherein the optimization data comprises a partially optimized representation of the first subplan.

8. The method of claim 1 wherein the optimization data comprises a completely optimized representation of the first subplan.

9. The method of claim 1 wherein the optimization data comprises statistics collected for the first subplan.

10. The method of claim 1 further comprising:
in response to a change in data that is part of the database query, evaluating by the hardware-implemented processor on the computer the effect of the change on the first and second subplans; and
reoptimizing the first and second subplans by the hardware-implemented processor on the computer if affected by the change.

11. The method of claim 10 wherein the change in data is a change in data causing an index that has become unavailable.

12. The method of claim 10 wherein the change in data is a change in data causing an increase in table size.

13. The method of claim 12 wherein the increase in table size is about 10 percent or more.

14. The method of claim 10 wherein the change in data includes using or no longer using symmetric multiprocessing.

15. The method of claim 1, further comprising:
during evaluation of the other query plan, partially optimizing the other query plan and deferring completion of optimizing the other query plan, wherein partially optimizing the other query plan includes partially optimizing the first subplan such that the cached optimization data includes at least one of a partially optimized representation of the first subplan and progress data generated during partial optimization of the first subplan; and
completing optimization of the first subplan during evaluation of the query plan.

16. An apparatus comprising:
a processor; and
program code configured to be executed by the processor to optimize a database query, the program code configured to generate a query plan for the database query wherein the query plan includes first and second subplans, retrieve cached optimization data associated with the first subplan and generated during evaluation of another query plan for a previous query that uses the first subplan wherein the cached optimization data does not include cached query results, evaluate the first subplan for resource cost using the retrieved optimization data, evaluate the second subplan for resource cost, and evaluate the query plan for resource cost based upon the evaluations of resource cost for the first and second subplans, wherein the cached optimization data is generated during evaluation of another query plan for a previous database query for which only partial optimization is completed and a portion of statistics collection for the other query plan is deferred.

17. The apparatus of claim 16 wherein the program code is further configured to cache new optimization data associated with the first and second subplans.

18. The apparatus of claim 16 wherein the program code is configured to evaluate the second subplan without relying on cached optimization data.

19. The apparatus of claim 16 wherein the program code is configured to evaluate the first and second subplans for resource cost by collecting statistics on the first and second subplans and estimating resource costs based on the collected statistics.

20. The apparatus of claim 16 wherein the program code is configured to evaluate the query plan for resource costs by comparing estimated resource costs between subplans, selecting or discarding subplans based on the resource costs, and estimating resource costs for the query plan based on the selected subplans.

21. The apparatus of claim 16 wherein the program code further is configured to select the query plan based on evaluations of resource cost and execute the query plan to generate a result set.

22. The apparatus of claim 16 wherein the program code is further configured to, in response to a change in data that is part of the database query, evaluate the effect of the change on the first and second subplans and reoptimize the first and second subplans if affected by the change.

23. The apparatus of claim 22 wherein the change in data is selected from the group consisting of a change in data causing an index that to become unavailable, a change in data causing an increase in table size of about 10 percent or more, and a decision to use or no longer use symmetric multiprocessing.

24. The apparatus of claim 16, wherein optimization data is selected from a group consisting of a partially optimized representation of the first subplan, a completely optimized representation of the first subplan, statistics collected for the first subplan, and combinations thereof.

25. A program product, comprising:
a computer recordable-type medium; and
a program code resident on the recordable-type medium and configured to optimize a database query, the program code further configured to generate a query plan for the database query wherein the query plan includes first and second subplans, retrieve cached optimization data associated with the first subplan and generated during evaluation of another query plan for a previous query that uses the first subplan wherein the cached optimization data does not include cached query results, evaluate the first subplan for resource cost using the retrieved optimization data, evaluate the second subplan for resource cost, and evaluate the query plan for resource cost based upon the evaluations of resource cost for the first and second subplans, wherein the cached optimization data is generated during evaluation of another query plan for a previous database query for which only partial optimization is completed and a portion of statistics collection for the other query plan is deferred.

* * * * *